United States Patent
Duong et al.

(10) Patent No.: US 10,900,414 B2
(45) Date of Patent: Jan. 26, 2021

(54) FAN ASSEMBLY HAVING FLOW RECIRCULATION CIRCUIT WITH GUIDE VANES

(71) Applicant: PRATT & WHITNEY CANADA CORP., Longueuil (CA)

(72) Inventors: Hien Duong, Mississauga (CA); Karan Anand, Mississauga (CA); Vijay Kandasamy, T. Palur (IN); Rakesh Munlyappa, Bangalore (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 127 days.

(21) Appl. No.: 16/199,073

(22) Filed: Nov. 23, 2018

(65) Prior Publication Data

US 2020/0165969 A1    May 28, 2020

(51) Int. Cl.
| | |
|---|---|
| *F02C 9/18* | (2006.01) |
| *F02C 3/34* | (2006.01) |
| *F02K 3/06* | (2006.01) |
| *F02C 7/04* | (2006.01) |
| *F04D 29/42* | (2006.01) |

(52) U.S. Cl.
CPC .............. *F02C 3/34* (2013.01); *F02C 7/04* (2013.01); *F02C 9/18* (2013.01); *F02K 3/06* (2013.01); *F04D 29/4226* (2013.01); *F05D 2220/36* (2013.01); *F05D 2240/80* (2013.01); *F05D 2260/606* (2013.01)

(58) Field of Classification Search
CPC .. F04D 27/0238; F04D 27/023; F04D 29/522; F04D 29/547; F04D 29/68; F04D 29/684; F04D 29/682; F02C 9/18
See application file for complete search history.

(56) References Cited

U.S. PATENT DOCUMENTS

| | | | | |
|---|---|---|---|---|
| 3,846,038 | A * | 11/1974 | Carriere | F04D 29/682 415/1 |
| 4,844,689 | A | 7/1989 | Seed | |
| 5,431,533 | A | 7/1995 | Hobbs | |
| 5,478,199 | A * | 12/1995 | Gliebe | B64D 33/02 415/119 |
| 8,834,116 | B2 * | 9/2014 | Guemmer | F04D 29/681 416/93 R |
| 2016/0177833 | A1 | 6/2016 | Simon-Delgado et al. | |
| 2018/0030893 | A1 | 2/2018 | Duong | |

FOREIGN PATENT DOCUMENTS

GB        2038425        7/1980

* cited by examiner

*Primary Examiner* — Kenneth J Hansen
*Assistant Examiner* — Maxime M Adjagbe
(74) *Attorney, Agent, or Firm* — Norton Rose Fulbright Canada LLP

(57) ABSTRACT

There is disclosed a fan assembly including a fan rotor including a hub and fan blades. The fan blades have a leading edge and a trailing edge. A fan stator downstream of the fan rotor relative to a direction of an airflow through the fan assembly. The fan stator includes vanes extending between radially inner ends and radially outer ends. A flow recirculation circuit has an inlet downstream of radially inner ends of the vanes of the fan stator and an outlet upstream of radially inner ends of the vanes. A recirculation stator has a plurality of stationary guide vanes circumferentially distributed around the axis and located in the flow recirculation circuit between the inlet and the outlet A method of operating the fan assembly is also disclosed.

20 Claims, 2 Drawing Sheets

FAN ASSEMBLY HAVING FLOW RECIRCULATION CIRCUIT WITH GUIDE VANES

TECHNICAL FIELD

The application relates generally to gas turbine engines and, more particularly, to fan assemblies of turbofan gas turbine engines.

BACKGROUND OF THE ART

The fans of many turbofan gas turbine engines have fan blades that have a high slope at their radially inner ends and thus have a large change in radius from leading edges to trailing edges of the fan blades. These geometric parameters may provide certain aerodynamic advantages. However, when the chord lengths of the fan blades are minimized for reducing overall weight, or when the thicknesses of the fan blades are increased for structural reasons, the resulting high slope may compromise the flow downstream of the fan blades. Consequently, the flow downstream of the fan blades can sometimes carry large circumferential wake and thick end wall boundary layers. This might impair performance of downstream components of the gas turbine engine.

SUMMARY

In one aspect, there is provided a fan assembly for a gas turbine engine comprising: a fan rotor rotatable about an axis, the fan rotor including a hub and fan blades, the fan blades having a leading edge and a trailing edge; a fan stator downstream of the fan rotor relative to a direction of an airflow through the fan assembly, the fan stator including vanes extending between radially inner ends and radially outer ends; a flow recirculation circuit having an inlet downstream of radially inner ends of the vanes of the fan stator and an outlet upstream of radially inner ends of the vanes; and a recirculation stator having a plurality of stationary guide vanes circumferentially distributed around the axis and located in the flow recirculation circuit between the inlet and the outlet.

In another aspect, there is provided a turbofan gas turbine engine comprising: a fan rotor rotatable about an axis, the fan rotor including a hub and fan blades, the fan blades having a leading edge and a trailing edge; a fan stator downstream of the fan rotor relative to a direction of an airflow through the fan rotor, the fan stator including vanes extending between radially inner ends and radially outer ends; a compressor rotor downstream of the fan stator and rotatable about the axis; a flow recirculation circuit having an inlet located axially between the fan stator and the compressor rotor and adjacent the radially inner ends of the vanes, the flow recirculation circuit having an outlet located upstream of the vanes relative to the direction of the airflow, the outlet located adjacent the radially inner ends of the fan rotor; and a plurality of guide vanes circumferentially distributed around the axis and located in the flow recirculation circuit, the guide vanes being stationary relative to the vanes of the fan stator.

In yet another aspect, there is provided a method of operating a fan assembly of a gas turbine engine comprising: receiving an airflow between fan blades extending from a hub of a fan rotor of the fan assembly rotatable about an axis and between vanes of a fan stator, the fan stator located downstream of the fan rotor relative to the airflow; drawing a portion of the airflow from downstream of the fan stator proximate radially inner ends of the vanes; changing an angle of the drawn portion of the airflow; and injecting the drawn portion of the airflow upstream of the fan stator and adjacent the hub.

DESCRIPTION OF THE DRAWINGS

Reference is now made to the accompanying figures in which.

DETAILED DESCRIPTION

Figure 1:
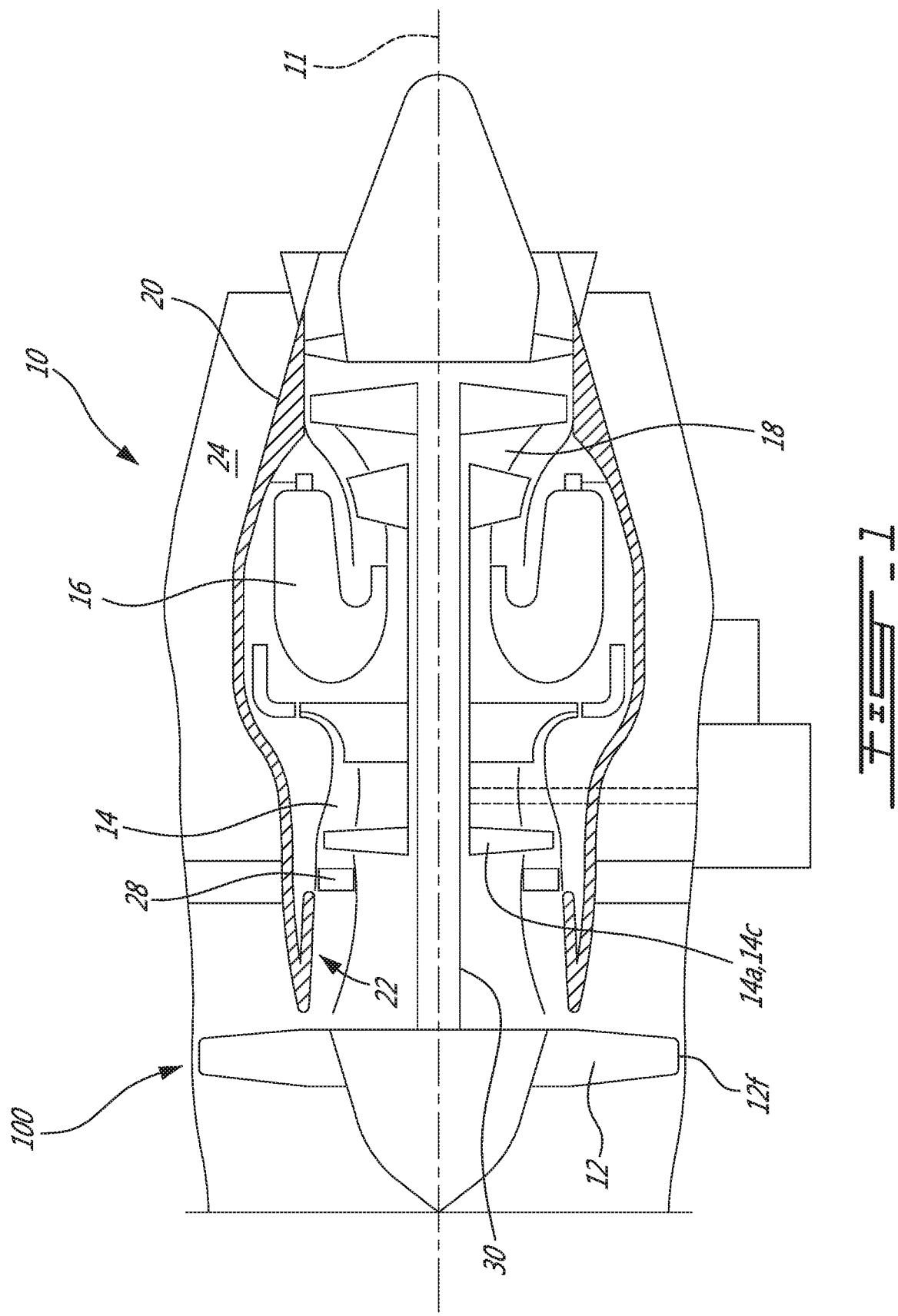
FIG. 1 is a schematic cross-sectional view of a gas turbine engine.

FIG. 1 illustrates a gas turbine engine 10 of a type preferably provided for use in subsonic flight, generally comprising in serial flow communication a fan assembly 100, which includes a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor, the compressor section 14, and the turbine section 18 are rotatable about the axis 11.

The gas turbine engine 10 has an engine casing 20 that circumferentially extends around the axis 11. The gas turbine engine 10 defines a core flow path 22 located radially inwardly of the engine casing 20 relative to the axis 11 and a bypass flow path 24 located radially outwardly of the engine casing 20 relative to the axis 11.

Figure 2:
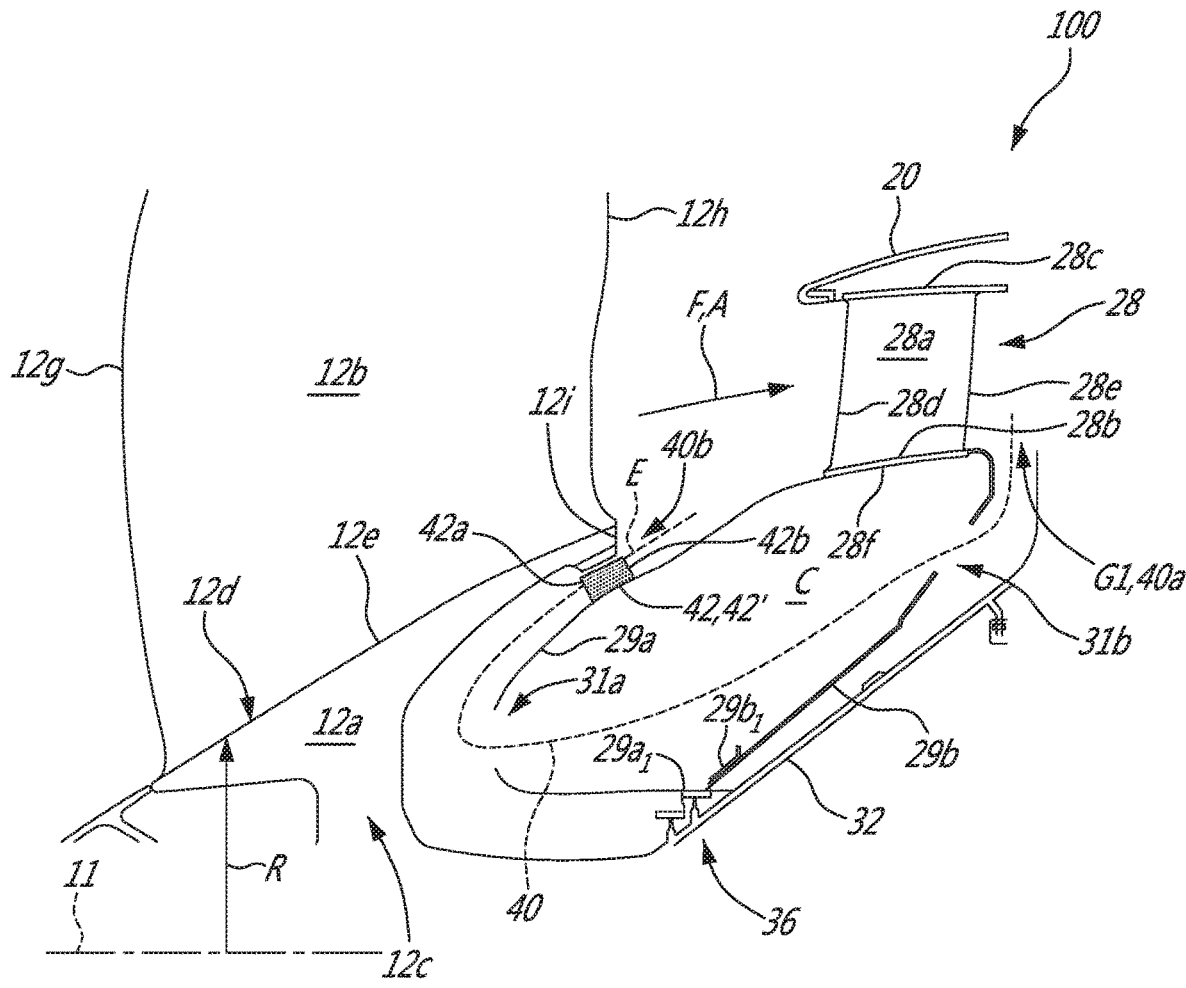
FIG. 2 is a schematic cross-sectional view of a portion of the gas turbine of FIG. 1 showing a fan assembly in accordance with one embodiment.

Referring to FIGS. 1-2, the fan assembly 100 includes the fan rotor 12, and a fan core stator (or simply "fan stator") 28 which is located within the engine core downstream of the fan rotor 12, relative to a direction of an airflow F circulating in the gas turbine engine 10. The direction of the airflow F is denoted by arrow A. The fan rotor 12 and the fan stator 28 are described one by one herein after.

The fan rotor 12 includes a hub 12a and fan blades 12b protruding radially outwardly from the hub 12a relative to the axis 11. The hub 12a is securable to a shaft 30 (FIG. 1) of the gas turbine engine 10 for integral rotation therewith. In the depicted embodiment, the hub 12a includes a disk 12c; the disk 12c defining a platform 12d from which the fan blades 12b protrude. The disk 12c may be secured to the shaft 30 of the gas turbine engine 10 for integral rotation therewith.

The fan blades 12b have radially inner ends 12e secured to the hub 12a and radially outer ends 12f (FIG. 1) that may be unsupported, or free. The fan blades 12b have leading edges 12g and trailing edges 12h downstream of the leading edges 12g relative to the direction of the airflow F, and pressure and suction sides extending from the leading edges 12g to the trailing edges 12h and from the radially inner ends 12e to the radially outer ends 12f on both sides of the fan blades 12b. The fan blades 12b extend through both of the core flow path 22 and the bypass flow path 24.

The platform 12d defines a wall that circumferentially extends all around the axis 11 to prevent the airflow F from flowing radially inwardly to the radially inner ends 12e of the fan blades 12b toward the axis 11. Stated otherwise, the wall defined by the platform 12d limits the airflow F from leaving the core flow path 22.

The fan stator 28 includes vanes 28a that extend between radially inner ends 28b and radially outer ends 28c. In the depicted embodiment, the vanes 28a are secured to the engine casing 20 at their radially outer ends 28c. Other configurations are contemplated without departing from the scope of the present disclosure. The vanes 28 have leading edges 28d and trailing edges 28e downstream of the leading edges 28d relative to the direction of the airflow F, and pressure and suction sides extending from the leading edges 28d to the trailing edges 28e and from the radially inner ends 28b to the radially outer ends 28c and on both sides of the vanes 28a. In the embodiment shown, the vanes 28a extend solely through the core flow path 22.

In the depicted embodiment, the vanes 28a protrude radially outwardly from a stationary stator platform 28f. The assembly 100 further includes an upstream stationary wall 29a extending from the stator platform 28f in an upstream direction relative to the airflow F, and a downstream stationary wall 29b extending from the stator platform 28b in a downstream direction relative to the airflow F. Both of the upstream and the downstream stationary walls 29a, 29b extend circumferentially all around the axis 11 of the gas turbine engine 10 and are, as the platform 28f, non-rotating relative to the axis 11. As illustrated in FIG. 2, the upstream and downstream stationary walls 29a, 29b meet at distal ends $29a_1$, $29b_1$ thereof relative to a distance from the stator platform 28f to enclose an annular cavity C. The annular cavity C may circumferentially extend all around the axis 11. As illustrated in FIG. 2, the annular cavity C is located radially inwardly of the hub 12a and of the vanes 28a. The upstream and downstream stationary walls 29a, 29b include each a series of apertures 31a, 31b.

The fan stator 28 is located upstream of a core compressor rotor 14a (FIG. 1) of the compressor section 14 relative to the direction of the airflow F. The compressor rotor 14a may rotate integrally with a shaft of the gas turbine engine 10 and may rotate integrally with the fan rotor 12. In the embodiment shown, a gap G1 is defined between the platform 28f of the fan stator 28 and the compressor rotor 14a (FIG. 1). More specifically, the gap G1 is located between the platform 28f of the fan stator 28 and a platform of the compressor rotor 14a from which compressor blades 14c (FIG. 1) protrude. The gap G1 allows the compressor rotor 14a and the fan stator 28 to rotate one relative to the other. Moreover, the gap G1 allows air circulating downstream of the stator vanes 28a to flow radially inwardly relative to the axis 11 to allow the recirculation of a portion of the flow F as will be described herein below.

As illustrated, a rotating wall 32 is secured to the hub 12a for integral rotation therewith. The rotating wall 32 may alternatively be secured to the shaft 30. The hub 12a of the fan rotor 12, the rotating wall 32, and the compressor rotor 14a may be monolithic. As illustrated, a sealing engagement 36 is provided at the distal ends $29a_1$, $29b_1$ of the upstream and downstream stationary walls 29a, 29b and the rotating wall 32. Any suitable seal known in the art may be used to provide the aforementioned sealing engagement 36. The sealing engagement 36 is used for limiting an airflow circulating radially between the upstream and downstream stationary walls 29a, 29b and the rotating wall 32. In a particular embodiment, the downstream stationary wall 29b and the sealing engagement 36 are omitted.

As illustrated, a radius R of the platform 12d of the hub 12a increases rapidly from the leading edges 12g to the trailing edges 12h of the fan blades 12b. It has been observed that such a large change in radius may have many benefits, such as, keeping the fan W/A low (where W is mass flow and A is area), reducing the fan $\Delta H/U^2$ (where $\Delta H$ is rotor work and U is rotational speed of the rotor), increasing the wheel speed of the low pressure (LP) compressor, and so on.

However, it has been observed that when chords of the fan blades 12b are minimized to reduce engine weight and/or length, and/or when thicknesses of the fan blades 12b are increased near their radially inner ends 12e for structural reason, the high rate of change of the radius R of the platform 12d of the hub 12a along the axis 11, and/or insufficient length of the platforms 28f, might compromise the airflow F in the vicinity of the hub 12a.

Indeed, at a rotational speed corresponding to about 80-90% of a design rotational speed of the fan rotor 12, the airflow F may carry large circumferential wake and thick end wall boundary layer. This might lead to an additional 10 degrees of positive incidence at the leading edges 28d of the vanes 28a of the fan stator 28. This end wall boundary layer might initiate premature stall on the fan stator 28 due to lower momentum, increase incidence of the vanes 28a of the fan stator 28, and increase in secondary flow. The above discussed effects might be compounded as the airflow F travels downstream and might negatively impair performance of downstream components (e.g., compressor section 14) of the gas turbine engine 10.

In the depicted embodiment, a flow recirculation circuit 40 is provided. The flow recirculation circuit as used herein is understood to be an airflow path, which may be composed of one or more interconnected passages, plenums, cavities, pipes, and/or conduits, and the like, or any combination of these as may be suitable to establish the airflow path for the recirculation air. The "circuit" 40 for flow recirculation may be an open circuit or a closed circuit. A flow path between parts, for example, may form all or part of the flow recirculation circuit 40, as can a fully enclosed air conduit. As illustrated, the flow recirculation circuit 40 encompasses the annular cavity C. The flow recirculation circuit 40 has an inlet 40a located downstream of the vanes 28a of the fan stator 28 and adjacent the radially inner ends 28b of the vanes 28a and has an outlet 40b defined between the upstream stationary wall and the rotor platform. In the embodiment shown, the outlet 40b of the flow recirculation circuit 40 is located downstream of the leading edges 12g of the fan blades 12b. As shown in FIG. 2, the flow recirculation circuit 40 extends through both of the series of apertures 31a, 31b defined through the upstream and downstream stationary walls 29a, 29b and through the annular cavity C. In other words, the inlet 40a of the flow recirculation circuit 40 is fluidly connected to the outlet 40b thereof via both of the series of apertures 31a, 31b defined through the upstream and downstream stationary walls 29a, 29b and via the annular cavity C.

In the depicted embodiment, the outlet 40b of the flow recirculation circuit 40 is an annular slot shown as a radial gap extending all around the axis 11. Other configurations are contemplated. The outlet 40b of the flow recirculation conduit 40 has an exit flow axis E being substantially parallel to the flow circulating in the core flow path 22. This might allow to avoid mixing loss when the recirculated flow is mixed with the fan core flow 22.

As illustrated in FIG. 2, the inlet 40a of the flow recirculation circuit 40 corresponds to the gap G1, which is an axial gap defined between the fan stator 28 and the compressor rotor 14a, more specifically between their respective platforms. Therefore, the inlet 40a of the flow recirculation circuit 40 is located downstream of the vanes 28a of the fan stator 28 and upstream of the compressor rotor 14a.

In a particular embodiment, it might be advantageous to guide the flow of air circulating within the flow recirculation circuit 40 before re-injecting said flow in the core flow path 22. In the depicted embodiment, the assembly 100 further includes a recirculation stator 42' plurality of guide vanes 42 that may be non-rotating about the axis 11. In other words, the recirculation stator 42', and the guide vanes 42, are stationary relative to the stator vanes 28a of the fan core stator 28. In the depicted embodiment, the guide vanes 42 are secured to the stator platform 28f. More specifically, the guide vanes 42 are secured to the upstream stationary wall 29a. The guide vanes 42 are circumferentially distributed all around the axis 11. The guide vanes 42 are configured for guiding the airflow out of the circuit 40. In the depicted embodiment, the guide vanes 42 are located at a rearmost location of the hub 12a of the fan rotor 12. In a particular embodiment, the flow is continuously accelerated through its passage between the guide vanes 42. In a particular embodiment, a speed of the flow circulating in the conduit 40 decreases via its passage in the conduit 40. Hence, locating the recirculation stator 42' closer to the outlet 40b than the inlet 40a might incur less loss than a configuration in which the recirculation stator 42' is located closer to the inlet 40a than the outlet 40b.

The guide vanes 42 have leading and trailing edges 42a, 42b as well as pressure and suction sides, which are on opposites sides of the guide vanes. In the embodiment shown in FIG. 2, the trailing edges 42b of the guide vanes 42 are located proximate a downstream end 12i of the hub 12. Other configurations are contemplated without departing from the scope of the present disclosure.

The guide vanes 42 have an angle of attack with respect to the axis 11. In a particular embodiment, the angle of attack ranges from 40 to 60 degrees. In a particular embodiment, a chord length of the guide vanes ranges from 10% to 25% of that of the blades 12b of the fan rotor 12. In a particular embodiment, a number of the guide vanes corresponds to that of the blades of the rotor. In a particular embodiment, each of the guide vanes is circumferentially aligned with a respective one of the blades of the rotor. The number of vane 42a may be chosen to provide a proper flow alignement from the downstream fan core stator 28a. The number of vanes selected may be from 2 to 4 times that of the fan blades. In a particular embodiment, the number of the guide vanes 42 may be more or less than that of the fan blades 12b of the fan rotor. In a particular embodiment, having the same number of vane 42a with fan blade 12b and align them circumferentially minimizes the number of wakes the vane 28a would see. This might be beneficial for vane 42a losses and dynamics response.

In a particular embodiment, the guide vanes 42 ensure correct flow angle is exposed to the stator vanes 28a. In a particular embodiment, the guide vanes 42 allow to accelerate the flow circulating around them such that the flow is re-introduced in the core flow path 22 with the highest possible momentum. In a particular embodiment, the guide vanes 42 allow to reduce flow separation, reduce flow blockage, improve stall range, lower losses of downstream components at cruise, and improve performance of downstream components. In a particular embodiment, the guide vanes 42 allows to increase downstream pressure near the radially inner ends of the stator vanes 28a, to fill up end wall boundary flow with high momentum flow and thus enhances flow conditions into downstream components. In a particular embodiment, from 1% to 3% of the fan core flow is reinjected via the flow recirculation circuit 40. Recirculating the flow with the rotating guide vanes 42, 142 as described herein might allow to improve performance of downstream components of the gas turbine engine 10.

In a particular embodiment, the guide vanes 42 redirect near wall flow at a more favourable angle to the downstream vane 28a of the fan core stator 28. This might result in stator stall range improvement at part speeds and lower loss at cruise. Improving fan exit condition through flow recirculation might be expected to benefit all subsequent downstream components of the engine.

For operating the fan assembly 100, 200, the airflow F is received between the fan blades 12b and between the vanes 28a of the fan stator 28. A portion of the airflow F is drawn from downstream of the fan stator 28 proximate the radially inner ends 28b of the vanes 28a. An angle of the drawn portion of the airflow F is changed. The drawn portion of the airflow F is injected upstream of the fan stator 28 and adjacent the hub 12a. In the embodiment shown, changing the angle includes circulating the drawn portion around the guide vanes 42. In the embodiment shown, injecting the drawn portion includes injecting the drawn portion at the angle of attack relative to the axis 11 ranging from 40 to 60 degrees.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fan assembly for a gas turbine engine comprising:
    a fan rotor rotatable about an axis, the fan rotor including a hub and fan blades, the fan blades having a leading edge and a trailing edge;
    a fan stator downstream of the fan rotor relative to a direction of an airflow through the fan assembly, the fan stator including a stator platform and vanes secured to the stator platform and extending between radially inner ends and radially outer ends;
    a flow recirculation circuit having an inlet downstream of the radially inner ends of the vanes of the fan stator and an outlet upstream of the radially inner ends of the vanes, in the inlet located adjacent the radially inner ends of the vanes; and
    a recirculation stator having a plurality of stationary guide vanes circumferentially distributed around the axis and located in the flow recirculation circuit between the inlet and the outlet, the plurality of stationary guide vanes secured to the stator platform.

2. The fan assembly of claim 1, wherein the flow recirculation circuit extends through an annular cavity that circumferentially extends around the axis, the annular cavity located radially inwardly of the stator platform, the vanes protruding radically outwardly from the stator platform.

3. The fan assembly of claim 2, wherein the fan stator includes an upstream stationary wall and a downstream stationary wall, the upstream and downstream stationary walls circumscribing the annular cavity and both extending from the stator platform.

4. The fan assembly of claim 3, wherein each of the upstream and downstream stationary walls defines a series of apertures circumferentially distributed around the axis, the inlet of the flow recirculation circuit fluidly connected to the outlet thereof via both of the series of apertures of the upstream and downstream stationary walls.

5. The fan assembly of claim 3, wherein the guide vanes are secured to the upstream stationary wall.

6. The fan assembly of claim 1, wherein the inlet is defined by an annular gap between the stator platform and a platform of a compressor rotor located downstream of the fan stator.

7. The fan assembly of claim 1, wherein chord lengths of the guide vanes ranges from 10% to 25% of that of the fan blades.

8. The fan assembly of claim 1, wherein trailing edges of the guide vanes are located proximate a downstream end of the hub.

9. The fan assembly of claim 1, wherein angle of attacks of the guide vanes relative to the axis ranges from 40 to 60 degrees.

10. A turbofan gas turbine engine comprising: a fan rotor rotatable about an axis, the fan rotor including a hub and fan blades, the fan blades having a leading edge and a trailing edge; a fan stator downstream of the fan rotor relative to a direction of an airflow through the fan rotor, the fan stator including vanes extending between radially inner ends and radially outer ends; a compressor rotor downstream of the fan stator and rotatable about the axis; a flow recirculation circuit having an inlet located axially between the fan stator and the compressor rotor and adjacent the radially inner ends of the vanes, the flow recirculation circuit having an outlet located upstream of the vanes relative to the direction of the airflow, the outlet located adjacent the radially inner ends of the vanes; and a plurality of guide vanes circumferentially distributed around the axis and located in the flow recirculation circuit, the guide vanes being stationary relative to the vanes of the fan stator.

11. The turbofan gas turbine engine of claim 10, wherein the flow recirculation circuit extends through an annular cavity that circumferentially extends around the axis, the annular cavity located radially inwardly of a stator platform, the vanes protruding radially outwardly from the stator platform.

12. The turbofan gas turbine engine of claim 11, wherein the fan stator includes an upstream stationary wall and a downstream stationary wall, the upstream and downstream stationary walls circumscribing the annular cavity and both extending from the stator platform.

13. The turbofan gas turbine engine of claim 12, wherein each of the upstream and downstream stationary walls defines a series of apertures circumferentially distributed around the axis, the inlet of the flow recirculation circuit fluidly connected to the outlet thereof via both of the series of apertures of the upstream and downstream stationary walls.

14. The fan assembly of claim 12, wherein the guide vanes are secured to the upstream stationary wall.

15. The turbofan gas turbine engine of claim 10, wherein chord lengths of the guide vanes ranges from 10% to 25% of that of the fan blades.

16. The turbofan gas turbine engine of claim 10, wherein the inlet is defined by an annular gap between a stator platform from which the vanes protrude and a platform of the compressor rotor.

17. The turbofan gas turbine engine of claim 10, wherein angle of attacks of the guide vanes relative to the axis ranges from 40 to 60 degrees.

18. A method of operating a fan assembly of a gas turbine engine comprising:
receiving an airflow between fan blades extending from a hub of a fan rotor of the fan assembly rotatable about an axis and between vanes of a fan stator, the fan stator located downstream of the fan rotor relative to the airflow;
drawing a portion of the airflow from downstream of the fan stator proximate radially inner ends of the vanes;
changing an angle of the drawn portion of the airflow by circulating the drawn portion around guide vanes being stationary relative to the fan stator; and
injecting the drawn portion of the airflow upstream of the fan stator and adjacent the hub.

19. The method of claim 18, wherein the drawing of the portion of the airflow includes drawing the portion of the airflow via an annular gap defined between a stator platform secured to the vanes and a platform of a compressor rotor downstream of the fan stator.

20. The method of claim 18, wherein injecting the drawn portion of the airflow includes injecting the drawn portion of the airflow at an angle of attack relative to the axis ranging from 40 to 60 degrees.

* * * * *